United States Patent
Huang et al.

(10) Patent No.: US 10,917,452 B2
(45) Date of Patent: Feb. 9, 2021

(54) SPEECH CODING ADJUSTMENT METHOD IN VOLTE COMMUNICATION AND SERVING BASE STATION THEREOF

(71) Applicant: CLOUDMINDS (SHENZHEN) ROBOTICS SYSTEMS CO., LTD., Shenzhen (CN)

(72) Inventors: William Xiao-qing Huang, New York, NY (US); Haitao Jiang, Shenzhen (CN); Zhenkai Wang, Shenzhen (CN)

(73) Assignee: CLOUDMINDS (SHENZHEN) ROBOTICS SYSTEMS CO., LTD., Shenzhen (CN)

( * ) Notice: Subject to any disclaimer, the term of this patent is extended or adjusted under 35 U.S.C. 154(b) by 0 days.

(21) Appl. No.: 16/409,074

(22) Filed: May 10, 2019

(65) Prior Publication Data
US 2019/0268396 A1    Aug. 29, 2019

Related U.S. Application Data

(63) Continuation of application No. PCT/CN2016/098365, filed on Sep. 7, 2016.

(51) Int. Cl.
*H04L 29/06* (2006.01)
*H04W 28/02* (2009.01)
(Continued)

(52) U.S. Cl.
CPC ............ *H04L 65/605* (2013.01); *H04L 65/80* (2013.01); *H04W 28/0289* (2013.01); *H04W 84/042* (2013.01); *H04W 88/08* (2013.01)

(58) Field of Classification Search
CPC . H03M 1/0631; H03M 1/0634; H04L 1/0003; H04L 1/0009; H04L 65/80;
(Continued)

(56) References Cited

U.S. PATENT DOCUMENTS

| 6,104,993 A | 8/2000 | Ashley |
| 2004/0160979 A1 | 8/2004 | Pepin |

(Continued)

FOREIGN PATENT DOCUMENTS

| CN | 1248339 A | 3/2000 |
| CN | 1273663 A | 11/2000 |

(Continued)

OTHER PUBLICATIONS

International Search Report dated May 27, 2017; PCT/CN2016/098365.

(Continued)

*Primary Examiner* — Ian N Moore
*Assistant Examiner* — Sun Jong Kim

(57) ABSTRACT

A speech coding adjustment method in voice over long-term evolution (VoLTE) communication and a serving base station thereof are disclosed. The method includes: acquiring, by a serving base station, quality information of the VoLTE communication based on a predetermined condition; smoothening, by the serving base station, the quality information; acquiring coding information of the VoLTE communication based on the smoothened quality information, the coding information including a final speech coding mode and a corresponding code rate; and sending, by the serving base station, the coding information to a serving base station corresponding to a peer terminal, such that the serving base station and the serving base station corresponding to the peer terminal perform a speech coding adjustment for the VoLTE communication.

12 Claims, 6 Drawing Sheets

(51) Int. Cl.
H04W 88/08 (2009.01)
H04W 84/04 (2009.01)

(58) Field of Classification Search
CPC ........ H04L 47/38; H04L 69/24; H04W 24/10; H04W 28/22; H04W 28/0289; H04W 36/22; H04W 88/181; H04W 28/0236; H04W 36/0022; H04W 36/0033; H04M 7/0072
See application file for complete search history.

(56) References Cited

U.S. PATENT DOCUMENTS

| | | | |
|---|---|---|---|
| 2010/0304738 A1* | 12/2010 | Lim ..................... | H04W 36/30 455/426.1 |
| 2015/0092575 A1 | 4/2015 | Khay-Ibbat et al. | |
| 2016/0119384 A1* | 4/2016 | Karimli ............... | H04L 65/1069 370/252 |

FOREIGN PATENT DOCUMENTS

| | | |
|---|---|---|
| CN | 1722891 A | 1/2006 |
| CN | 101656807 A | 2/2010 |
| CN | 105493615 A | 4/2016 |

OTHER PUBLICATIONS

CMCC. "TP for VoLTE / Video codec adaption" BGPP TSG-RAN WG2 Meeting #95, R2-165297, Goteborg, Sweden,Aug. 22-26, 2016. Aug. 26, 2018(Aug. 26, 2016).
Intel Corporation. "RAN-based codes mode/rate adaption mechanism for VoLTE" BGPP TSG-RAN WG2 Meeting #95, R2-164993, Gothenburg, Sweden,Aug. 22-26, 2016, Aug. 26, 2016(Aug. 26, 2016)
1st Office Action dated Mar. 25, 2020 by the CN Office; Appln.No. 2016800468697.

* cited by examiner

SPEECH CODING ADJUSTMENT METHOD IN VOLTE COMMUNICATION AND SERVING BASE STATION THEREOF

CROSS-REFERENCE TO RELATED APPLICATIONS

This application is a continuation of International Application No. PCT/CN2016/098365, with an international filing date of Sep. 7, 2016, the entire contents of which are incorporated herein by reference.

TECHNICAL FIELD

Embodiments of the present application relate to the technical field of communications, and in particular, relate to a speech coding adjustment method in VoLTE communication, and a serving base station thereof.

BACKGROUND

Long-term evolution (LTE), as an evolved technology of 3G, has such unique technical advantages as high data rate, low delay, flexible bandwidth configuration and the like. Voice over LTE (VoLTE) is a communication technology based on packet switched domain of the LTE. Traditional VoLTE communication involves three speech coding modes, AMR, AMR-WB and EVS. A base station selects a speech coding mode and a code rate for VoLTE communication based on explicit marking of congestion by a core network in IP packets.

Through long-term studies, the inventors of the present application have identified that in VoLTE communication between terminals, a serving base station on a wireless side adjusts the speech coding mode and the code rate of the VoLTE communication quickly and dynamically. However, fast adjustment of the code rate may cause constant fluctuations of voice quality of the terminals, and thus user experience is unstable. In addition, the serving base station generally adjusts the speech coding mode and the code rate on its own side, and the situation of a peer serving base station is not taken into consideration. As such, resources at both serving base stations are mismatched and wasted.

SUMMARY

An embodiment of the present application provides a speech coding adjustment method in VoLTE communication. The method includes: acquiring, by a serving base station, quality information of the VoLTE communication based on a predetermined condition; smoothening, by the serving base station, the quality information; acquiring coding information of the VoLTE communication based on the smoothened quality information, the coding information including a final speech coding mode and a corresponding code rate; and sending, by the serving base station, the coding information to a serving base station corresponding to a peer terminal, such that the serving base station and the serving base station corresponding to the peer terminal perform a speech coding adjustment for the VoLTE communication.

Another embodiment of the present application provides a serving base station. The serving base station includes: at least one processor; a memory communicably connected to the at least one processor; wherein the memory stores computer-executable instructions that are executable by the at least one processor, wherein the computer-executable instructions, when being executed by the at least one processor, cause the at least one processor to perform the steps of: acquiring quality information of the VoLTE communication based on a predetermined condition; smoothening the quality information; acquiring coding information of the VoLTE communication based on the smoothened quality information, the coding information including a final speech coding mode and a corresponding code rate; and sending the coding information to a serving base station corresponding to a peer terminal, such that the serving base station and the serving base station corresponding to the peer terminal perform a speech coding adjustment and code rate adjustment for the VoLTE communication.

Still another embodiment of the present application provides a non-volatile computer-readable storage medium. The non-volatile computer-readable storage medium stores computer-executable instructions that are executable by a computer; wherein the computer executable instructions, when being executed, cause the computer to perform the steps of: acquiring quality information of the VoLTE communication based on a predetermined condition; smoothening the quality information; acquiring coding information of the VoLTE communication based on the smoothened quality information, the coding information including a final speech coding mode and a corresponding code rate; and sending the coding information to a serving base station corresponding to a peer terminal, such that the serving base station and the serving base station corresponding to the peer terminal perform a speech coding adjustment and a code rate adjustment for the VoLTE communication.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

The present application is further described with reference to the accompanying drawings and exemplary embodiments.

Figure 1:
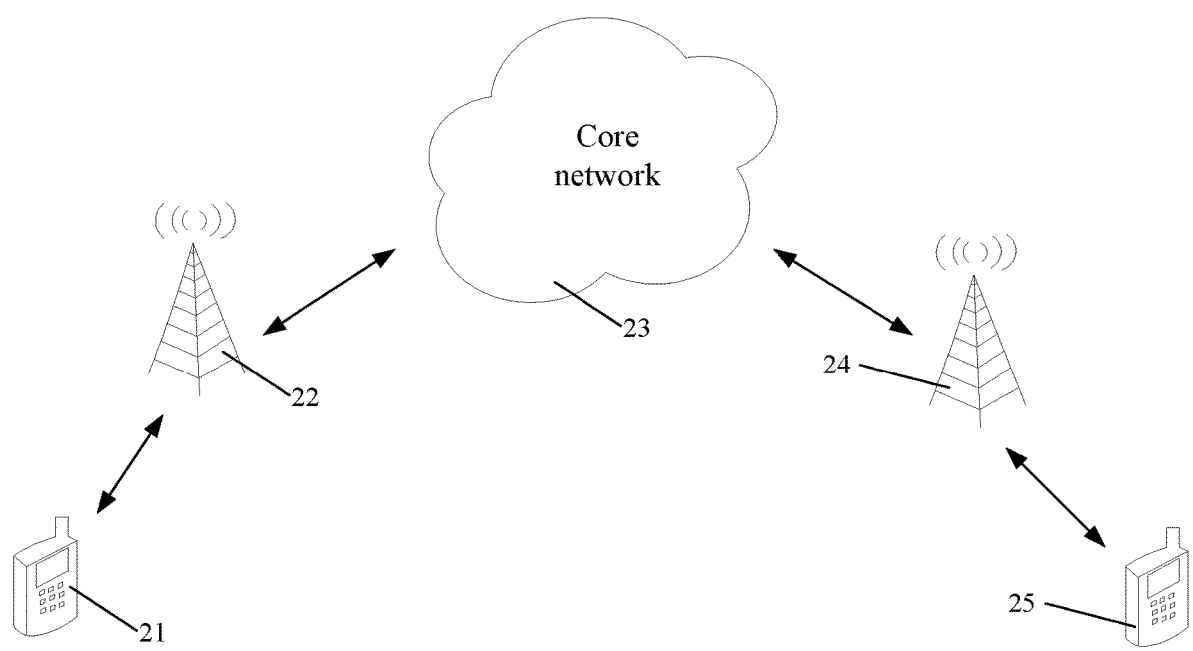
FIG. 1 is a schematic diagram of a network communication system according to an embodiment of the present application.

Referring to FIG. 1, a network communication system 20 includes a local terminal 21, a local serving base station 22, a core network 23, a peer serving base station 24 and a peer terminal 25. The local terminal 21 is within a coverage of the local serving base station 22, and a communication connection is established between the local terminal 21 and the local serving base station 22. The peer terminal 25 is within a coverage of the peer serving base station 24, and a communication connection is established between the peer terminal 25 and the peer serving base station 24. The local serving base station 22 and the peer serving base station 24 are both communicably connected to the core network 23. The local serving base station 22 is equivalent to an access device for connecting the local terminal 21 to the access network 23. Therefore, information exchanged between the local terminal 21 and the core network 23 is forwarded via the local serving base station 22. Likewise, the peer serving base station 24 is equivalent to an access device for connecting the peer terminal 25 to the core network 23, and thus information exchanged between the peer terminal 25 and the core network 23 is also forwarded via the peer serving base station 24.

Figure 2:
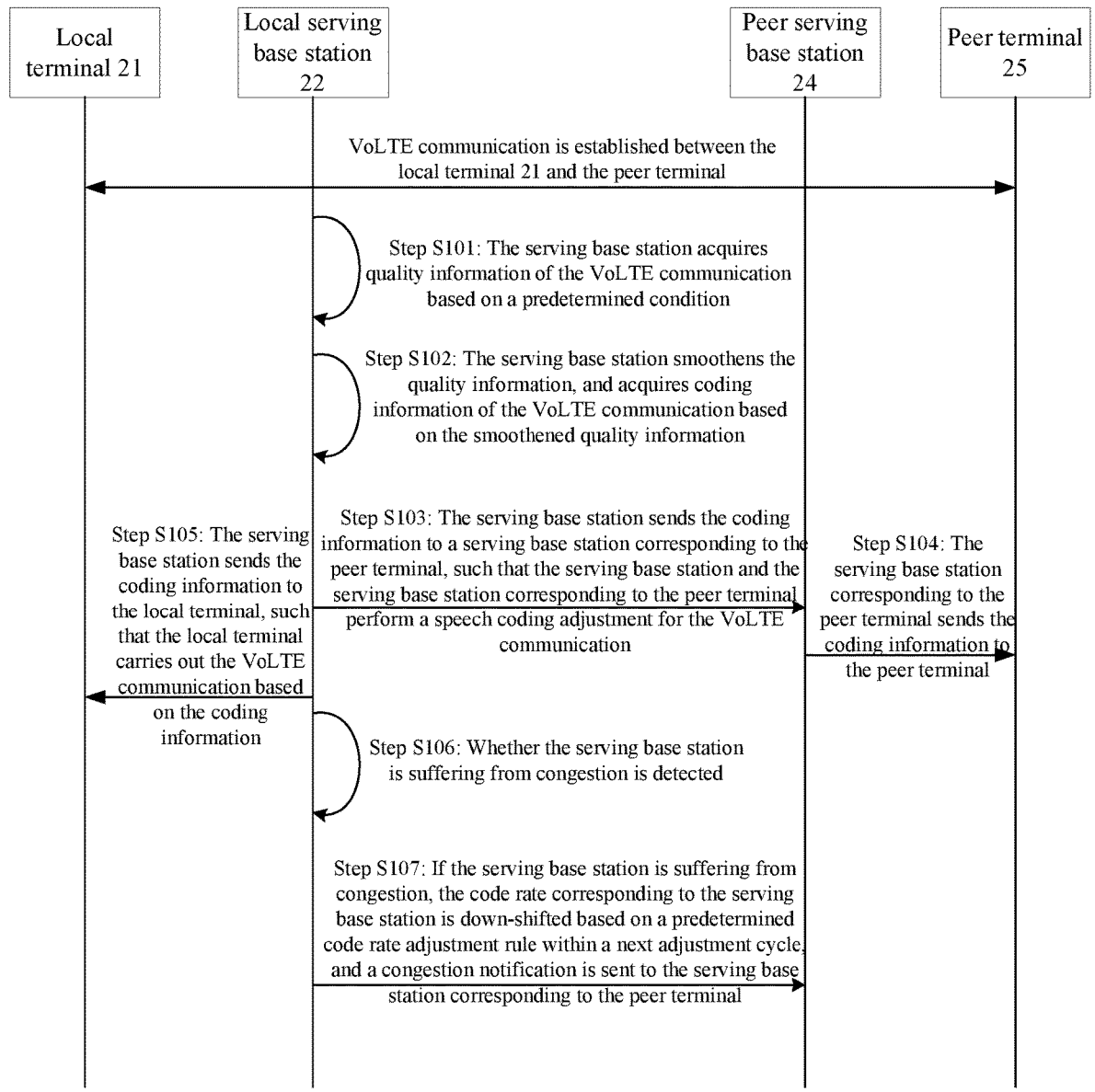
FIG. 2 is a flowchart of adjusting a speech coding mode and/or a code rate of VoLTE communication according to the present application.

After VoLTE communication is established between the local terminal and the peer terminal, the local serving base station 22 or the peer serving base station 24 may also adjust a speech coding mode and/or a code rate of the VoLTE communication according to the actual needs, and send the adjusted speed coding mode and/or code rate to the peer serving base station such that the peer serving base station also makes adjustment to ensure that the speech coding mode and the code rate are consistent in the local serving base station and the peer serving base station. This effectively addresses the problem of mismatch of transmission resources and waste of resources due to respective adjustments of the speech coding mode and the code rate on the local and peer sides. Specifically, as illustrated in FIG. 2, the process of adjusting the speech coding mode of the VoLTE communication by the local serving base station includes the following steps:

Step S101: The serving base station acquires quality information of the VoLTE communication based on a predetermined condition.

Step S102: The serving base station smoothens the quality information, and acquires coding information of the VoLTE communication based on the smoothened quality information, wherein the coding information includes a final communication speech coding mode and a corresponding code rate.

By smoothening the quality information and determining the coding information of the VoLTE communication based on the smoothened quality information, smooth speech transition of the VoLTE communication could be ensured, a great difference between a current speech and a previous speech is prevented, and user experience is ensured.

Step S103: The serving base station sends the coding information to a serving base station corresponding to the peer terminal, such that the serving base station and the serving base station corresponding to the peer terminal perform a speech coding adjustment for the VoLTE communication.

Step S104: The serving base station corresponding to the peer terminal sends the coding information to the peer terminal.

Step S105: The serving base station sends the coding information to the local terminal, such that the local terminal carries out the VoLTE communication based on the coding information.

Upon adjusting the speech coding mode and/or the code rate of the VoLTE communication on the local side, the local serving base station sends the adjusted speech coding mode and/or code rate to the peer serving base station, such that the peer serving base station synchronizes the speech coding mode and/or the code rate based on the predetermined condition to ensure that the speech coding modes and the code rates on the two sides are consistent. Nevertheless, upon receiving the coding information, the peer serving base station may also compare the received coding information with coding information thereof. If more transmission resources are consumed for the VoLTE communication based on the coding information of the peer serving base station, the VoLTE communication may be carried out using the received coding information. If fewer transmission resources are consumed for the VoLTE communication based on the coding information of the peer serving base station, the VoLTE communication may be carried out still using the coding information of the peer serving base station.

The predetermined condition is a condition for adjusting the VoLTE communication. In this embodiment, the predetermined condition includes an adjustment cycle for adjusting the speech coding mode and/or the code rate of the VoLTE communication. Within one adjustment cycle, the speech coding mode and/or the code rate is allowed to be adjusted once for the VoLTE communication. If the speech coding mode and/or the code rate upon the adjustment still fails to reach the requirement, the speech coding mode and/or the code rate may be adjusted within a next adjustment cycle. Nevertheless, within one adjustment cycle, multiple adjustments may also be allowed. When a count of adjustments reaches a maximum value, adjustment may only be performed within a next adjustment cycle. By defining the adjustment cycle, audio effect fluctuations caused by frequent adjustments of the speech coding mode and the code rate of the VoLTE communication may be avoided, and thus user experience is ensured. In other alternative embodiments, the predetermined condition may also be another determined condition for adjusting the coding speech mode and/or the code rate of the VoLTE communication.

The adjustment cycle may be configured by a subjective evaluation method. That is, auditory effects in the adjustment cycle of different optimal speech coding modes and corresponding code rates are evaluated by one or a group of assessors to determine specific durations of the adjustment cycle. Alternatively, the adjustment cycle may be configured by an objective evaluation method. That is, distortions, in time-domain waveforms, of input speeches and output speeches number at the code rates corresponding to different speech coding modes are measured by spectrum distance measure, LPC cepstrum distance measure, Bark spectrum measure or Mel spectrum measure and the like algorithms, to determine the specific durations of the adjustment cycles. Still alternatively, the adjustment cycle may be configured with a combination of the subjective evaluation method and the objective evaluation method, and weighting is carried out to determine the specific duration of the adjustment cycle.

Further, after the speech coding mode and/or the code rate is adjusted, whether the serving base station is suffering from congestion is detected. If the serving base station is suffering from congestion, the code rate is down-shifted within a next adjustment cycle. This process specifically includes the following steps:

Step S106: Whether the serving base station is suffering from congestion is detected.

Step S107: If the serving base station is suffering from congestion, the code rate corresponding to the serving base station is down-shifted based on a predetermined code rate adjustment rule within a next adjustment cycle, and a congestion notification is sent to the serving base station corresponding to the peer terminal, such that the serving base station corresponding to the peer terminal synchronously down-shifts the code rate of speech coding in the VoLTE communication based on the predetermined code rate adjustment rule within the next adjustment cycle.

The quality information includes a channel quality of a channel used by the local terminal, and a load of the serving base station used by the local terminal. The smoothening the quality information includes: smoothening at least one of the channel quality and the load in the quality information. To be brief, the channel quality may be smoothened, or the load may be smoothened, or both the channel quality and the load may be smoothened. The determining the quality information based on the smoothened quality information specifically includes: when the channel quality is smoothened, determining the coding information based on the load and the smoothened channel quality; when the load is smoothened, determining the coding information based on the channel quality and the smoothened load; and when both the channel quality and the load are smoothened, determining the coding information based on the smoothened load and channel quality.

It should be noted that the load and the channel quality are smoothened in the same way. The smoothening is performed based on the following formula:

$$F = (1-a) * F' + a * M$$
$$a = \frac{1}{2^{\left(\frac{k}{4}\right)}}$$

In the above formula, F is the smoothened load of the serving base station or the smoothened channel quality of the local terminal, F' is the smoothened load of the serving base station or the smoothened channel quality of the local terminal in a previous adjustment cycle, M is the load of the serving base station or the channel quality of the local terminal, and k is a smoothening filter parameter. When of the smoothened load of the local serving base station 22 and the smoothened channel quality of the local terminal 21 is calculated for the first time, F' is a predetermined initial value, wherein the predetermined initial value is not limited in the present application.

Figure 3:
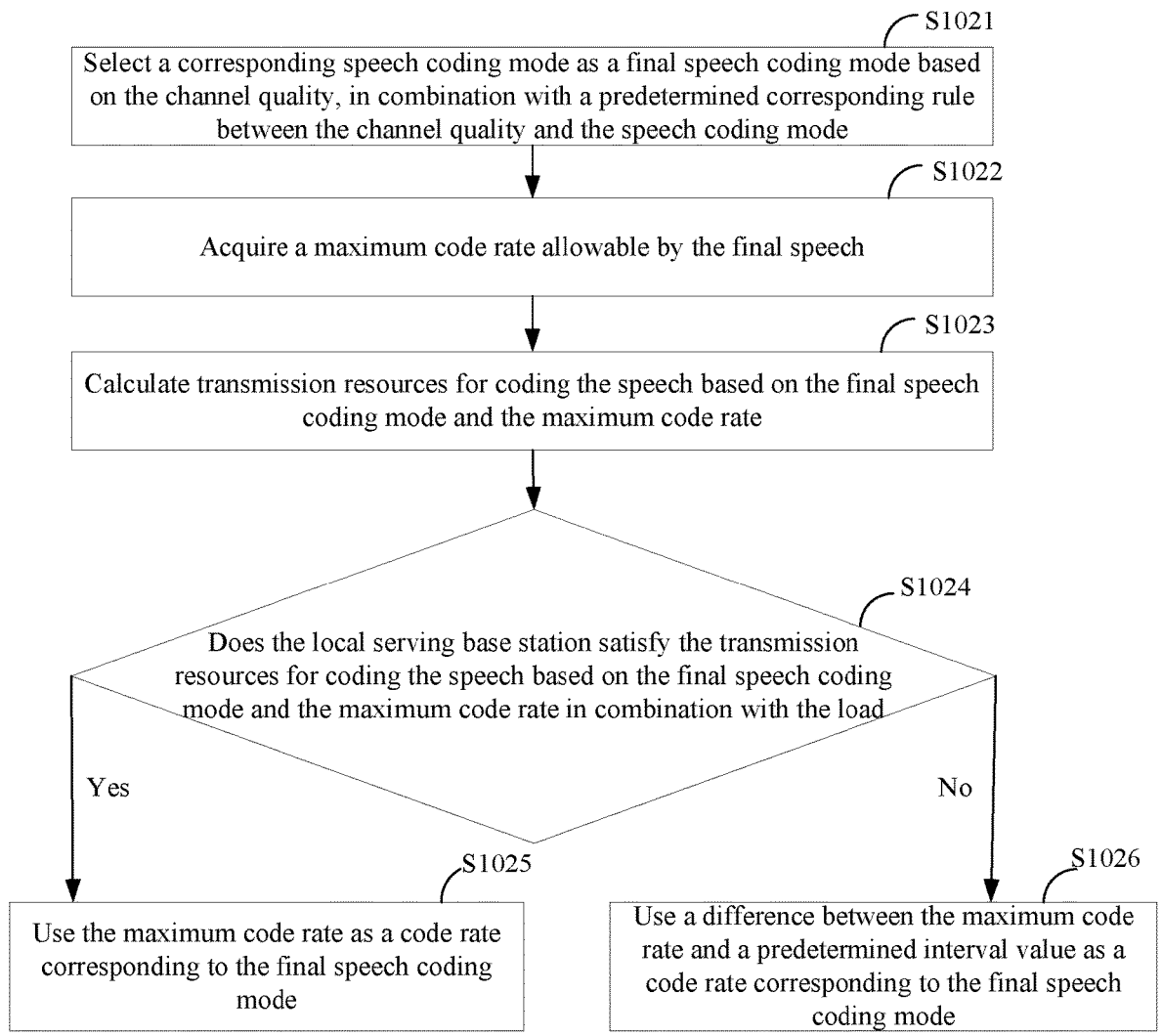
FIG. 3 is a flowchart of determining a final speech coding mode and/or a code rate based on quality information upon smoothening according to the present application.

Different speech coding modes have different requirements on a minimum channel quality or load of the base station desired for demodulation. On the contrary, the speech coding mode may be determined based on the channel quality or the load of the base station. For example, when the channel quality is greater than 16 dB, an AMR-WR speech coding mode is selected; and when the channel quality is greater than 10 dB and less than 16 dB, an ARM speech coding mode is selected. With respect to the same speech coding mode, a higher code rate thereof indicates better transmission quality of the coded speech. Therefore, selecting a maximum allowable code rate may ensure the transmission quality of the speech to the greatest extent. Specifically, referring to FIG. 3, the acquiring the coding information of the VoLTE communication based on the smoothened quality information includes the following steps:

Step S1021: A corresponding speech coding mode is selected as a final speech coding mode based on the channel quality, in combination with a predetermined corresponding rule between the channel quality and the speech coding mode.

Step S1022: A maximum code rate allowable by the final speech coding mode is acquired.

Step S1023: Transmission resources for coding the speech based on the final speech coding mode and the maximum code rate are calculated.

Step S1024: Whether the local serving base station satisfies the transmission resources for coding the speech based on the final speech coding mode and the maximum code rate is judged in combination with the load.

Step S1025: If the local serving base station satisfies the transmission resources for coding the speech based on the final speech coding mode and the maximum code rate, the maximum code rate is used as a code rate corresponding to the final speech coding mode.

Step S1026: If the local serving base station does not satisfy the transmission resources for coding the speech based on the final speech coding mode and the maximum code rate, a difference between the maximum code rate and a predetermined interval value is used as a code rate corresponding to the final speech coding mode.

It should be noted that: since both the load and the channel quality may be smoothened, or either of the load or the channel quality may be smoothened, when both the load and the channel quality are smoothened, the load and the channel quality in step S1021 to step S1026 are all the smoothened values; and when either of the load or the channel quality is smoothened, in step S1021 to step S1026, a smoothened value is used for what is smoothened, and an original value is used for what is not smoothened.

In the embodiment of the present application, upon determining the coding information including the final communication speech coding mode and the corresponding code rate, the local serving base station sends the coding information to the serving base station corresponding to the peer terminal, such that the serving base station and the serving base station corresponding to the peer terminal perform a speech coding adjustment for the VoLTE communication, and thus the peer serving base station and the local serving base station synchronously adjust the speech coding mode and the code rate of the VoLTE communication. This effectively addresses the problem of transmission resources mismatch and waste of resources due to respective adjustments of the speech coding mode and the code rate on the local and peer sides. In addition, the local serving base station determines the final communication speech coding mode and the corresponding code rate based on the smoothened quality information. This ensures a smooth speech transition of the VoLTE communication, such that severe variations of the speech in the VoLTE communication are prevented. Further, the final communication speech coding mode and the corresponding code rate are acquired based on the predetermined condition. This prevents speech variations due to frequent adjustments of the speech coding mode and/or the code rate between a current speech and a previous speech, and thus ensures user experience.

Figure 4:
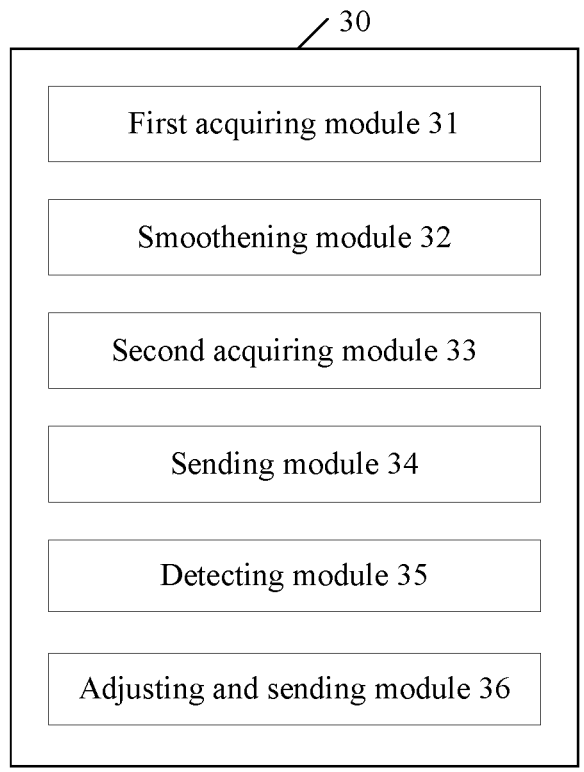
FIG. 4 is a schematic diagram of a serving base station according to an embodiment of the present application.

The present application further provides a base station embodiment. Referring to FIG. 4, a base station 30 includes a first acquiring module 31, a smoothening module 32, a second acquiring module 33 and a sending module 34.

The first acquiring module 31 is configured to acquire quality information of the VoLTE communication based on a predetermined condition when VoLTE communication is established between a local terminal and a peer terminal. A serving base station is a base station corresponding to the local terminal. The smoothening module 32 is configured to smoothen the quality information. The second acquiring module 33 is configured to acquire coding information of the VoLTE communication based on the smoothened quality information, the coding information includes a final speech coding mode and a corresponding code rate. The sending module 34 is configured to send the coding information to a serving base station corresponding to the peer terminal, such that the serving base station and the serving base station corresponding to the peer terminal perform a speech coding adjustment and a code rate adjustment for the VoLTE communication.

By synchronously adjusting the speech coding mode and the code rate at the peer serving base station and the local serving base station, the problem of mismatch of transmission resources and waste of resources due to respective adjustments of the speech coding mode and the code rate on the local and peer sides is effective addressed. In addition, the local serving base station determines the final communication speech coding mode and the corresponding code rate based on the smoothened quality information. This ensures smooth speech transition of the VoLTE communication, and severe variations of the speech in the VoLTE communication are prevented. Further, the final communication speech coding mode and the corresponding code rate are acquired based on the predetermined condition. This prevents the speech variations due to frequent adjustments of the speech coding mode and/or the code rate between a current speech and a previous speech, and thus ensures the audio effect.

Specifically, the quality information includes channel quality of a channel used by the local terminal, and a load of the serving base station used by the local terminal. The smoothening the quality information includes: smoothening at least one of the channel quality and the load in the quality information. When either of the channel quality or the load is smoothened, the coding information is determined based on a value of what is smoothened and a value of what is not smoothened among the channel quality and the load; and when both the channel quality and the load are smoothened, the coding information is determined based on the smoothened channel quality and the load. The determining the coding information based on the channel quality and the load may be referenced to the embodiments of the speech coding adjustment method in VoLTE communication, which is not described herein any further. However, the load and the channel quality are smoothened in the same way, and the load and the channel quality may be smoothened based on the same formula as follows:

$$F = (1-a)*F' + a*M$$
$$a = \frac{1}{2^{\left(\frac{k}{4}\right)}}$$

In the above formula, F is the smoothened load of the serving base station or the smoothened channel quality of the local terminal, F' is the smoothened load of the serving base station or the smoothened channel quality of the local terminal in a previous adjustment cycle, M is the load of the serving base station or the channel quality of the local terminal, and k is a smoothening filter parameter. When of the smoothened load of the local serving base station 22 and the smoothened channel quality of the local terminal 21 is calculated for the first time, F' is a predetermined initial value, wherein the predetermined initial value is not limited in the present application.

The predetermined condition is a condition determined for adjusting the VoLTE communication. In this embodiment, the predetermined condition includes a determined adjustment cycle for adjusting the speech coding mode and/or the code rate of the VoLTE communication. By defining the adjustment cycle, audio effect fluctuations caused by frequent adjustments of the speech coding mode and the code rate of the VoLTE communication may be prevented, and thus user experience is ensured. In other alternative embodiments, the predetermined condition may also be another determined condition for adjusting the coding speech mode and/or the code rate of the VoLTE communication.

The adjustment cycle may be measured by a subjective evaluation method. That is, auditory effects in the adjustment cycles of different optimal speech coding modes and corresponding code rates are graded by one or a group of assessors to determine specific durations of the adjustment cycles. Alternatively, the adjustment cycle may be measured by an objective evaluation method. That is, distortions of input speeches and output speeches number at the corresponding code rates in different speech coding modes in time-domain waveforms are measured by spectrum distance measure, LPC cepstrum distance measure, Bark spectrum measure or Mel spectrum measure and the like algorithms, to determine the specific durations of the adjustment cycles. Still alternatively, the adjustment cycle may be measured with a combination of the subjective evaluation method and the objective evaluation method, and the specific durations of the adjustment cycles are determined by weighted processing.

Further, after the speech coding mode and/or the code rate is adjusted, whether the serving base station is suffering from congestion is detected. If the serving base station is suffering from congestion, the code rate is down-shifted within a next adjustment cycle. In this case, the serving base station further includes: a detecting module 35 and an adjusting and sending module 36.

The detecting module 35 is configured to detect whether the serving base station is suffering from congestion. The adjusting and sending module 36 is configured to: if the detecting module 35 detects that the serving base station is suffering from congestion, down-shift the code rate corresponding to the serving base station based on a predetermined code rate adjustment rule within a next adjustment cycle, and send a congestion notification to the serving base station corresponding to the peer terminal, such that the serving base station corresponding to the peer end synchronously down-shifts the code rate of the speech coding in the VoLTE communication based on the predetermined code rate adjustment rule within the next adjustment cycle.

In the embodiment of the present application, upon determining the coding information including the final communication speech coding mode and the corresponding code rate, the serving base station sends the coding information to the serving base station corresponding to the peer terminal, such that the serving base station and the serving base station corresponding to the peer terminal perform a speech coding adjustment for the VoLTE communication, and thus the peer serving base station and the local serving base station synchronously adjust the speech coding mode and the code rate of the VoLTE communication. This effectively addresses the problem of mismatch of transmission resources and waste of resources due to respective adjustments of the speech coding mode and the code rate on the local and peer sides. In addition, the serving base station determines the final communication speech coding mode and the corresponding code rate based on the smoothened quality information. This ensures smooth speech transition of the VoLTE communication, and severe variations of the speech in the VoLTE communication are prevented. Further, the final communication speech coding mode and the corresponding code rate are acquired based on the predetermined condition. This prevents speech variations due to frequent adjustments of the speech coding mode and/or the code rate between a current speech and a previous speech, and thus ensures user experience.

Figure 5:
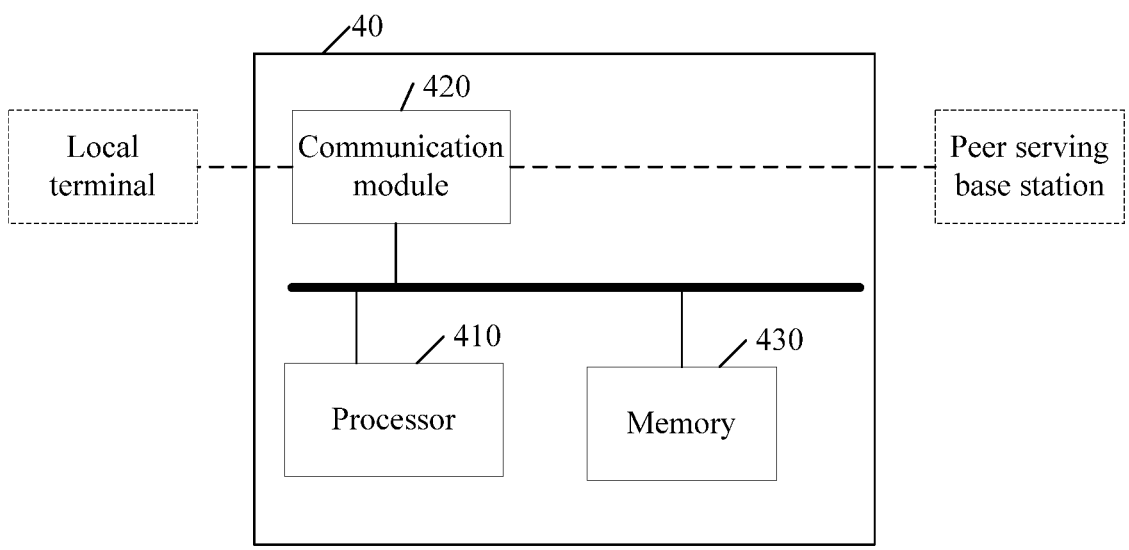
FIG. 5 is a schematic diagram of an electronic device according to an embodiment of the present application.

Referring to FIG. 5, FIG. 5 is a schematic diagram of an electronic device 40 according to an embodiment of the present application.

Figure 6:
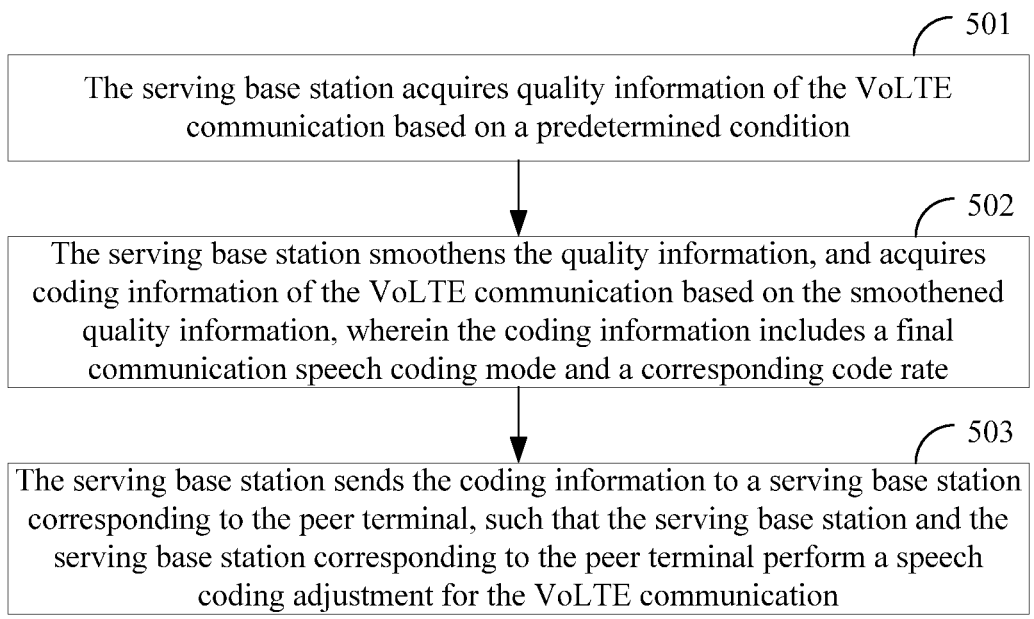
FIG. 6 is a flowchart of a speech coding adjustment method in VoLTE communication according to one embodiment of the present application.

As illustrated in FIG. 5, the electronic device 40 includes at least one processor 410 and a memory 430. FIG. 6 uses one processor 410 as an example.

The at least one processor 410 and the memory 430 may be connected via a bus or in another manner, and FIG. 5 uses the bus as an example. Nevertheless, the electronic terminal 40 may include a communication module 420, and the electronic terminal 40 is connected to an external device via the communication module 420. For example, a peer serving base station communicates with a local terminal.

The memory 430, as a non-volatile computer-readable storage medium, may be configured to store non-volatile software programs, non-volatile computer-executable programs and modules, for example, the program instructions/modules corresponding to the speech coding adjustment method in VoLTE communication in the embodiments of the present application (for example, the first acquiring module 31 and the smoothening module 33, the second acquiring module 33, the sending module 34, the detecting module 35 and the adjusting and sending module 36 as illustrated in FIG. 4). The non-volatile software programs, instructions and modules are stored in the memory 410, when being executed, cause the processor 430 to perform various applications and data processing of a server, that is, performing the speech coding adjustment method in VoLTE communication in the above method embodiments.

The memory 430 may include a program memory area and data memory area, wherein the program memory area may store operation systems and application programs needed by at least one function; and the data memory area may store data created according to the use of the base station. In addition, the memory 430 may include a high speed random access memory, or include a non-volatile memory, for example, at least one disk storage device, a flash memory device, or another non-volatile solid storage device. In some embodiments, the memory 430 optionally includes memories remotely configured relative to the processor 410. These remote memories may be connected to a base station over a network. Examples of the above network include, but not limited to, the Internet, Intranet, local area network, mobile communication network and a combination thereof.

Figure 7:
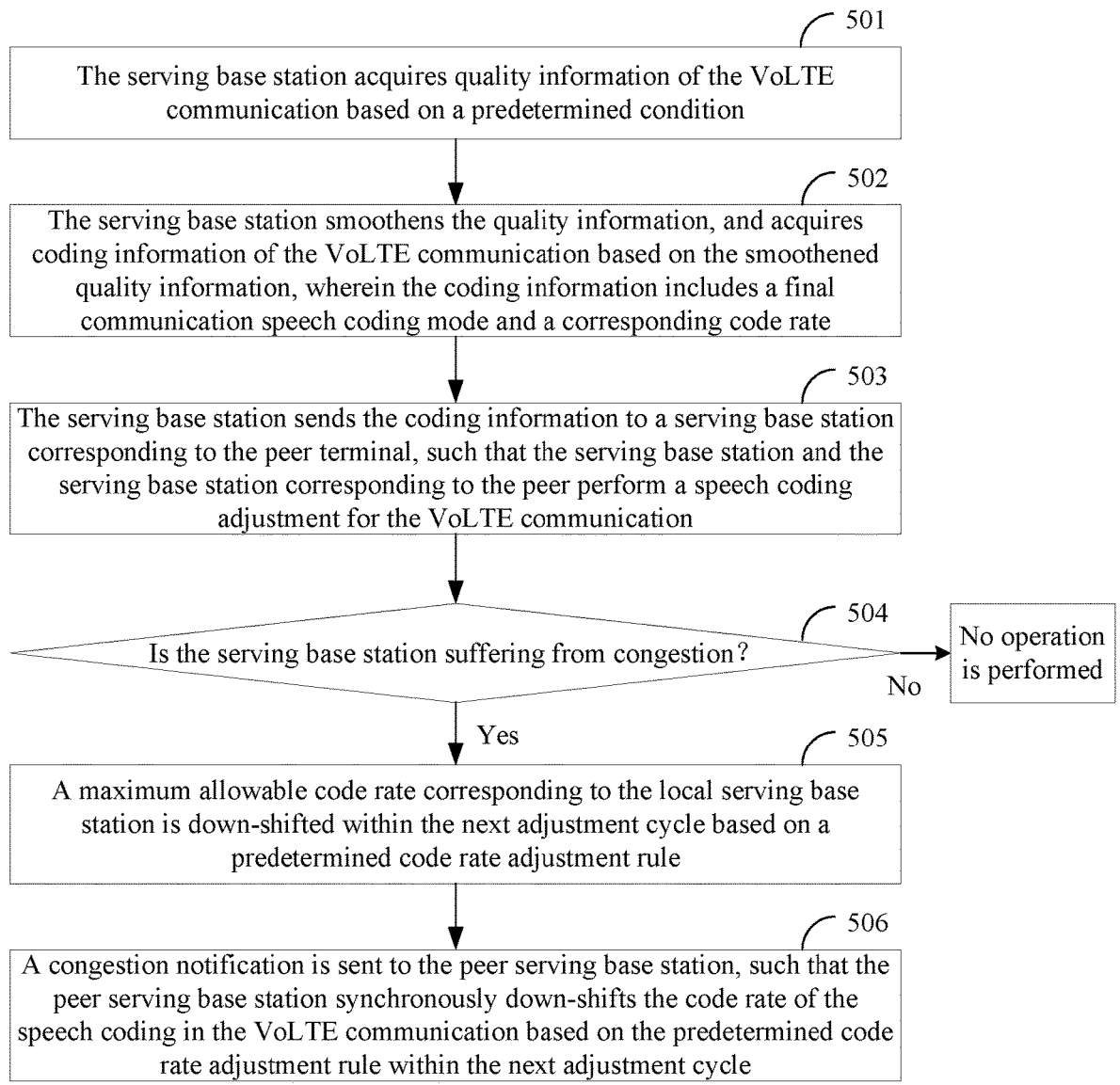
FIG. 7 is a flowchart of a speech coding adjustment method in VoLTE communication according to another embodiment of the present application.

One or more modules are stored in the memory 430, and when being executed by the at least one processor 410, perform the speech coding adjustment method in VoLTE communication in any of the above method embodiments, for example, performing steps 501 to 504 in the method as illustrated in FIG. 6 and steps 501 to 506 in the method as illustrated in FIG. 7, and implementing the functions of the first acquiring module 31, the smoothening module 32, the second acquiring module 33, the sending module 34, the detecting module 35 and the adjusting and sending module 36 as illustrated in FIG. 4.

The product may perform the method according to the embodiments of the present application, has corresponding function modules for performing the method, and achieves the corresponding beneficial effects. For technical details that are not illustrated in detail in this embodiment, reference may be made to the description of the methods according to the embodiments of the present application.

An embodiment of the present application further provides a non-volatile computer-readable storage medium. The computer-readable storage medium stores computer executable instructions, which, when being executed by at least one processor, for example, the at least one processor 410 as illustrated in FIG. 5, cause the at least one processor to perform the speech coding adjustment method in VoLTE communication in any of the above method embodiments, for example, performing steps 501 to 504 in the method as illustrated in FIG. 6 and steps 501 to 506 in the method as illustrated in FIG. 7, and implementing the functions of the first acquiring module 31, the smoothening module 32, the second acquiring module 33, the sending module 34, the detecting module 35 and the adjusting and sending module 36 as illustrated in FIG. 4.

The above described apparatus embodiments are merely for illustration purpose only. The units which are described as separate components may be physically separated or may be not physically separated, and the components which are illustrated as units may be or may not be physical units, that is, the components may be located in the same position or may be distributed into a plurality of network units. A part or all of the modules may be selected according to the actual needs to achieve the objectives of the technical solutions of the embodiments.

According to the above embodiments of the present application, a person skilled in the art may clearly understand that the embodiments of the present application may be implemented by means of hardware or by means of software plus a necessary general hardware platform. Persons of ordinary skill in the art may understand that all or part of the steps of the methods in the embodiments may be implemented by a program instructing relevant hardware. The program may be stored in a computer readable storage medium and may be executed by at least one processor. When the program runs, the steps of the methods in the embodiments are performed. The storage medium may be any medium capable of storing program codes, such as read-only memory (ROM), a random access memory (RAM), a magnetic disk, or a compact disc-read only memory (CD-ROM).

Finally, it should be noted that the above embodiments are merely used to illustrate the technical solutions of the present application rather than limiting the technical solutions of the present application. Under the concept of the present application, the technical features of the above embodiments or other different embodiments may be combined, the steps therein may be performed in any sequence, and various variations may be derived in different aspects of the present application, which are not detailed herein for brevity of description. Although the present application is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present application.

An embodiment of the present application further provides a non-volatile computer-readable storage medium. The computer-readable storage medium stores computer-executable instructions, which, when being executed by at least one processor, cause the at least one processor to perform steps 501 to 504 in the method as illustrated in FIG. 6 and steps 501 to 506 in the method as illustrated in FIG. 7, and implement the functions of the first acquiring module 31, the smoothening module 32, the second acquiring module 33, the sending module 34, the detecting module 35 and the adjusting and sending module 36 as illustrated in FIG. 4.

In the embodiment of the present application, upon determining the coding information including the final communication speech coding mode and the corresponding code rate, the electronic device station sends the coding information to the serving base station corresponding to the peer terminal, such that the electronic device station and the serving base station corresponding to the peer terminal perform a speech coding adjustment for the VoLTE communication, and thus the peer serving base station and the local serving base station synchronously adjust the speech coding mode and/or the code rate of the VoLTE communication. This effectively addresses the problem of mismatch of transmission resources and waste of resources due to respective adjustments of the speech coding mode and the code rate on the local and peer sides. In addition, the electronic device determines the final communication speech coding mode and the corresponding code rate based on the smoothened quality information. This ensures smooth speech transition of the VoLTE communication, and severe variations of the speech in the VoLTE communication are prevented. Further, the final communication speech coding mode and the corresponding code rate are acquired based on the predetermined condition. This prevents speech variations due to frequent adjustments of the speech coding mode and/or the code rate between a current speech and a previous speech, and thus ensures user experience.

The present application further provides an embodiment of the speech coding adjustment method of VoLTE communication. Referring to FIG. 6, the method includes the following steps:

Step 501: The serving base station acquires quality information of the VoLTE communication based on a predetermined condition.

The predetermined condition is a condition determined for adjusting speech coding of the VoLTE communication. The quality information of the VoLTE communication may be acquired and the coding information of the VoLTE communication is determined, only when the predetermined condition is satisfied.

Step 502: The serving base station smoothens the quality information, and acquires coding information of the VoLTE communication based on the smoothened quality information, wherein the coding information includes a final communication speech coding mode and a corresponding code rate.

By smoothening the quality information and determining the coding information of the VoLTE communication based on the smoothened quality information, smooth speech transition of the VoLTE communication may be ensured, and a great difference between a current speech and a previous speech is prevented, and user experience is ensured.

The quality information includes channel quality of a channel used by the local terminal, and a load of the serving base station used by the local terminal.

The smoothening the quality information includes: smoothening at least one of the channel quality and the load in the quality information. To be brief, the channel quality may be only smoothened, or the load may be only smoothened, or both the channel quality and the load may be smoothened. The determining the quality information based on the smoothened quality information specifically includes: when the channel quality is smoothened, determining the coding information based on the load and the smoothened channel quality; when the load is smoothened, determining the coding information based on the channel quality and the smoothened load; and when both the channel quality and the load are smoothened, determining the coding information based on the smoothened load and channel quality. However, the load and the channel quality are smoothened in the same fashion, and the load and the channel quality may be smoothened based on the same formula as follows:

$$F = (1-a)*F' + a*M$$

$$a = \frac{1}{2^{(\frac{k}{4})}}$$

In the above formula, F is load of the serving base station or channel quality of the local terminal upon the smoothening, F' is load of the serving base station or channel quality of the local terminal upon previous smoothening, M is load of the serving base station or channel quality of the local terminal, and k is a smoothening filter parameter. When the smoothening of the load of the local serving base station 22 and the channel quality of the local terminal 21 is calculated, F' is a predetermined initial value, which is not limited in the present application. In addition, the specific process of acquiring the coding information of the VoLTE communication based on the smoothened quality information may be referenced to the speech coding adjustment method in VoLTE communication, which is not described herein any further.

Step S503: The serving base station sends the coding information to a serving base station corresponding to the peer terminal, such that the serving base station and the serving base station corresponding to the peer perform speech coding adjustment for the VoLTE communication.

After the serving base station adjusts the code rate, the peer serving base station synchronously adjusts the code rate, to ensure synchronous adjustments between the serving base station and the peer serving base station and prevent single-end adjustments.

The predetermined condition is a determined condition for adjusting the VoLTE communication. In this embodiment, the predetermined condition includes a determined adjustment cycle for adjusting the speech coding mode and/or the code rate of the VoLTE communication. Within one adjustment cycle, the speech coding mode and/or the code rate is allowed to be adjusted once for the VoLTE communication. If the speech coding mode and/or the code rate upon the adjustment still fails to reach the requirement, the speech coding mode and/or the code rate may be adjusted within a next adjustment cycle. Nevertheless, within one adjustment cycle, multiple adjustments may also be allowed. When a count of adjustments reaches a maximum value, adjustment may only be performed within a next adjustment cycle. By defining the adjustment cycle, sound effect fluctuations caused by frequent adjustments of the speech coding mode and the code rate of the VoLTE communication may be prevented, and thus user experience is ensured. In other alternative embodiments, the predetermined condition may also be another determined condition for adjusting the coding speech mode and/or the code rate of the VoLTE communication.

The adjustment cycle may be measured by a subjective evaluation method. That is, auditory effects in the adjustment cycles of different optimal speech coding modes and corresponding code rates are graded by one or a group of assessors to determine specific durations of the adjustment cycles. Alternatively, the adjustment cycle may be measured by an objective evaluation method. That is, distortions of input speeches and output speeches number at the corresponding code rates in different speech coding modes in time-domain waveforms are measured by spectrum distance measure, LPC cepstrum distance measure, Bark spectrum measure or Mel spectrum measure and the like algorithms, to determine the specific durations of the adjustment cycles. Still alternatively, the adjustment cycle may be measured with a combination of the subjective evaluation method and the objective evaluation method, and the specific durations of the adjustment cycles are determined by weighted processing.

Further, after the serving base station determines to adjust the speech coding mode and/or the code rate of the VoLTE communication, the local terminal carries out the VoLTE communication based on the adjusted speech coding mode and code rate. In the VoLTE communication between the local terminal and the peer terminal, the serving base station may detect whether the serving base station is suffering from congestion. If the serving base station is suffering from congestion, the local serving base station may adjust the speech coding mode and the code rate within a next adjustment cycle. Specifically, referring to FIG. 6, the method further includes the following steps:

Step 504: Whether the serving base station is suffering from congestion is detected; if the serving base station is suffering from congestion, step 505 is performed; and otherwise, no operation is performed.

Step 505: A maximum allowable code rate corresponding to the local serving base station is down-shifted within the next adjustment cycle based on a predetermined code rate adjustment rule.

The predetermined code rate adjustment rule may be defined according to the actual needs. For example, a value obtained by subtracting a predetermined value from the code rate is used as a new code rate, and when the new code rate still fails to satisfy the requirement within the next adjustment cycle, the speech coding mode may be adjusted.

Step 506: A congestion notification is sent to the peer serving base station, such that the peer serving base station synchronously down-shifts the code rate of the speech coding in the VoLTE communication based on the predetermined code rate adjustment rule within the next adjustment cycle.

In the embodiment of the present application, upon determining the coding information including the final communication speech coding mode and the corresponding code rate, the local serving base station sends the coding information to the serving base station corresponding to the peer terminal, such that the serving base station and the serving base station corresponding to the peer terminal perform a speech coding adjustment for the VoLTE communication, and thus the peer serving base station and the local serving base station synchronously adjust the speech coding mode and the code rate of the VoLTE communication. This effectively addresses the problem of mismatch of transmission resources and waste of resources due to respective adjustments of the speech coding mode and the code rate on the local and peer sides. In addition, the local serving base station determines the final communication speech coding mode and the corresponding code rate based on the smoothened quality information. This ensures smooth speech transition of the VoLTE communication, and severe variations of the speech in the VoLTE communication are prevented. Further, the final communication speech coding mode and the corresponding code rate are acquired based on the predetermined condition. This prevents speech variations due to frequent adjustments of the speech coding mode and/or the code rate between a current speech and a previous speech, and thus ensures user experience.

Described above are exemplary embodiments of the present application, but are not intended to limit the scope of the present application. Any equivalent structure or equivalent process variation made based on the specification and drawings of the present application, which is directly or indirectly applied in other related technical fields, fall within the scope of the present application.

What is claimed is:

1. A speech coding adjustment method in voice over long-term evolution (VoLTE) communication, wherein the method comprises:

acquiring, by a serving base station, quality information of the VoLTE communication based on a predetermined condition;

smoothening, by the serving base station, the quality information;

acquiring coding information of the VoLTE communication based on the smoothened quality information, the coding information comprising a final speech coding mode and a corresponding code rate; and sending, by the serving base station, the coding information to a peer serving base station corresponding to a peer terminal, such that the serving base station and the peer serving base station perform a speech coding adjustment for the VoLTE communication;

wherein the quality information comprises a channel quality of a channel used by a local terminal, and a load of the serving base station used by the local terminal; and the smoothening the quality information comprises:

smoothening at least one of the channel quality and the load in the quality information;

wherein the smoothening is performed based on the following formula:

$$F = (1-a) * F' + a * M$$

$$a = \frac{1}{2^{\left(\frac{k}{4}\right)}}$$

wherein F is the smoothened load of the serving base station or the smoothened channel quality of the local terminal, F' is the smoothened load of the serving base station or the smoothened channel quality of the local terminal in a previous adjustment cycle, M is the load of the serving base station or the channel quality of the local terminal, and k is a smoothening filter parameter, a is a smoothening parameter, * is the multiplication operator.

2. The method according to claim 1, wherein the acquiring coding information of the VoLTE communication based on the smoothened quality information comprises:
selecting a corresponding speech coding mode as the final speech coding mode based on the channel quality, in combination with a predetermined corresponding rule between the channel quality and the speech coding mode;
acquiring a maximum code rate allowable by the final speech coding mode;
calculating transmission resources for coding a speech based on the final speech coding mode and the maximum code rate;
determining whether the serving base station satisfies the transmission resource required for encoding the speech based on the final speech coding mode and the maximum code rate, in combination with the load of the serving base station;
if the serving base station satisfies the transmission resources for coding the speech based on the final speech coding mode and the maximum code rate, using the maximum code rate as the code rate corresponding to the final speech coding mode; and
if the serving base station does not satisfy the transmission resources for coding the speech based on the final speech coding mode and the maximum code rate, using a difference between the maximum code rate and a predetermined interval value as the code rate corresponding to the final speech coding mode.

3. The method according to claim 1, wherein the predetermined condition comprises an adjustment cycle for adjusting the speech coding mode and/or the code rate of the VoLTE communication.

4. The method according to claim 3, further comprising:
detecting whether the serving base station is suffering from congestion; and
if the serving base station is suffering from congestion, down-shifting the code rate corresponding to the serving base station based on a predetermined code rate adjustment rule within a next adjustment cycle, and sending a congestion notification to the peer serving base station, such that the peer serving base station synchronously down-shifts the code rate of speech coding of the VoLTE communication based on the predetermined code rate adjustment rule within the next adjustment cycle.

5. A serving base station, comprising:
at least one processor;
a memory communicably connected to the at least one processor; wherein the memory stores computer-executable instructions that are executable by the at least one processor, wherein the computer-executable instructions, when being executed by the at least one processor, cause the at least one processor to perform the steps of:
acquiring quality information of a voice over long-term evolution (VoLTE) communication based on a predetermined condition;
smoothening the quality information;
acquiring coding information of the VoLTE communication based on the smoothened quality information, the coding information comprising a final speech coding mode and a corresponding code rate; and
sending the coding information to a peer serving base station corresponding to a peer terminal, such that the serving base station and the peer serving base station perform a speech coding adjustment and code rate adjustment for the VoLTE communication;
wherein the quality information comprises a channel quality of a channel used by a local terminal, and a load of the serving base station used by the local terminal; and
the smoothening the quality information comprises:
smoothening at least one of the channel quality and the load in the quality information;
wherein the smoothening is performed based on the following formula:

$$F = (1-a)*F' + a*M$$

$$a = \frac{1}{2^{\left(\frac{k}{4}\right)}}$$

wherein F is the smoothened load of the serving base station or the smoothened channel quality of the local terminal, F' is the smoothened load of the serving base station or the smoothened channel quality of the local terminal within a previous adjustment cycle, M is the load of the serving base station or the channel quality of the local terminal, and k is a smoothening filter parameter, a is a smoothening parameter, * is the multiplication operator.

6. The serving base station according to claim 5, wherein the acquiring coding information of the VoLTE communication based on the smoothened quality information further comprises:
selecting a corresponding speech coding mode as the final speech coding mode based on the channel quality, in combination with a predetermined corresponding rule between the channel quality and the speech coding mode;
acquiring a maximum code rate allowable by the final speech coding mode;
calculating transmission resources for coding a speech based on the final speech coding mode and the maximum code rate;
determining whether the serving base station satisfies the transmission resource required for encoding the speech based on the final speech coding mode and the maximum code rate, in combination with the load of the serving base station;
if the serving base station satisfies the transmission resources for coding the speech based on the final speech coding mode and the maximum code rate, using the maximum code rate as the code rate corresponding to the final speech coding mode; and
if the serving base station does not satisfy the transmission resources for coding the speech based on the final speech coding mode and the maximum code rate, using a difference between the maximum code rate and a predetermined interval value as the code rate corresponding to the final speech coding mode.

7. The serving base station according to claim 5, wherein the predetermined condition comprises an adjustment cycle for adjusting the speech coding mode and/or the code rate of the VoLTE communication.

8. The serving base station according to claim 7, wherein the computer-executable instructions, when being executed by the at least one processor, cause the at least one processor to perform the steps of:
- detecting whether the serving base station is suffering from congestion; and
- if the serving base station is suffering from congestion, down-shift the code rate corresponding to the serving base station based on a predetermined code rate adjustment rule within a next adjustment cycle, and sending a congestion notification to the peer serving base station, such that the peer serving base station synchronously down-shift the code rate of speech coding of the VoLTE communication based on the predetermined code rate adjustment rule within the next adjustment cycle.

9. A memory storing computer-executable instructions that are executable by a computer; wherein the computer executable instructions, when being executed, cause the computer to perform the steps of:
- acquiring quality information of a voice over long-term evolution (VoLTE) communication based on a predetermined condition;
- smoothening the quality information;
- acquiring coding information of the VoLTE communication based on the smoothened quality information, the coding information comprising a final speech coding mode and a corresponding code rate; and
- sending the coding information to a peer serving base station corresponding to a peer terminal, such that a base station and the peer serving base station perform a speech coding adjustment and a code rate adjustment for the VoLTE communication;
- wherein the quality information comprises a channel quality of a channel used by a local terminal, and a load of the serving base station used by the local terminal; and
- the smoothening the quality information comprises:
- smoothening at least one of the channel quality and the load in the quality information;
- wherein the smoothening is performed based on the following formula:

$$F = (1-a)*F' + a*M$$
$$a = \frac{1}{2^{\left(\frac{k}{4}\right)}}$$

wherein F is the smoothened load of the serving base station or the smoothened channel quality of the local terminal, F' is the smoothened load of the serving base station or the smoothened channel quality of the local terminal within a previous adjustment cycle, M is the load of the serving base station or the channel quality of the local terminal, and k is a smoothening filter parameter, a is a smoothening parameter, * is the multiplication operator.

10. The memory according to claim 9, wherein the acquiring coding information of the VoLTE communication based on the smoothened quality information further comprises:
- selecting a corresponding speech coding mode as the final speech coding mode based on the channel quality, in combination with a predetermined corresponding rule between the channel quality and the speech coding mode;
- acquiring a maximum code rate allowable by the final speech coding mode;
- calculating transmission resources for coding a speech based on the final speech coding mode and the maximum code rate;
- determining whether the serving base station satisfies the transmission resource required for encoding the speech based on the final speech coding mode and the maximum code rate, in combination with the load of the serving base station;
- if the serving base station satisfies the transmission resources for coding the speech based on the final speech coding mode and the maximum code rate, using the maximum code rate as the code rate corresponding to the final speech coding mode; and
- if the serving base station does not satisfy the transmission resources for coding the speech based on the final speech coding mode and the maximum code rate, using a difference between the maximum code rate and a predetermined interval value as the code rate corresponding to the final speech coding mode.

11. The memory according to claim 9, wherein the predetermined condition comprises an adjustment cycle for adjusting the speech coding mode and/or the code rate of the VoLTE communication.

12. The memory according to claim 11, wherein the computer executable instructions, when being executed, cause the computer to perform the steps of:
- detecting whether the serving base station is suffering from congestion; and
- if the serving base station is suffering from congestion, down-shift the code rate corresponding to the serving base station based on a predetermined code rate adjustment rule within a next adjustment cycle, and sending a congestion notification to the peer serving base station, such that the peer serving base station synchronously down-shift the code rate of speech coding of the VoLTE communication based on the predetermined code rate adjustment rule within the next adjustment cycle.

* * * * *